(12) United States Patent
Kim et al.

(10) Patent No.: US 11,787,302 B2
(45) Date of Patent: Oct. 17, 2023

(54) CHARGING CONTROL DEVICE FOR ELECTRIC VEHICLE AND METHOD THEREOF

(71) Applicants: Hyundai Motor Company, Seoul (KR); Kia Corporation, Seoul (KR)

(72) Inventors: Do Hoon Kim, Whasung-Si (KR); Young Sik Kim, Whasung-Si (KR); Jeong Hye Choi, Whasung-Si (KR); Tae Hee Jung, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 61 days.

(21) Appl. No.: 17/346,783

(22) Filed: Jun. 14, 2021

(65) Prior Publication Data
US 2022/0048397 A1    Feb. 17, 2022

(30) Foreign Application Priority Data

Aug. 12, 2020  (KR) .................. 10-2020-0101355
Oct. 26, 2020  (KR) .................. 10-2020-0139532

(51) Int. Cl.
*B60L 53/30*    (2019.01)
*B60L 53/16*    (2019.01)
*B60L 5/42*     (2006.01)

(52) U.S. Cl.
CPC .............. *B60L 53/305* (2019.02); *B60L 5/42* (2013.01); *B60L 53/16* (2019.02); *B60L 2210/42* (2013.01); *B60L 2240/549* (2013.01); *B60L 2240/80* (2013.01); *H04B 2203/547* (2013.01)

(58) Field of Classification Search
CPC ...................................... B60L 53/305

USPC ........................................................ 320/109
See application file for complete search history.

(56) References Cited

U.S. PATENT DOCUMENTS

| 2009/0224724 | A1  | 9/2009  | Ma |
| 2012/0038324 | A1* | 2/2012  | Humphrey .............. B60L 53/62 320/138 |
| 2012/0249066 | A1* | 10/2012 | Ichikawa .................. H02J 7/04 320/109 |
| 2012/0274278 | A1  | 11/2012 | Igata |
| 2012/0288016 | A1* | 11/2012 | Ichikawa ................ B60L 50/72 375/257 |

(Continued)

FOREIGN PATENT DOCUMENTS

| EP | 2525466 A    | 11/2012 |
| EP | 3415361 A    | 12/2018 |
| JP | 2011-151717 A | 8/2011 |

OTHER PUBLICATIONS

European Search Report from European Patent Office dated Dec. 14, 2021.

*Primary Examiner* — Suchin Parihar
(74) *Attorney, Agent, or Firm* — MORGAN, LEWIS & BOCKIUS LLP

(57) ABSTRACT

A charging control device of an electric vehicle and a method thereof may include requesting a charging required current from a charger in a state in which power line communication (PLC) with the charger is established, detecting a round trip time required to receive a response to the request, and adjusting a switching period of a multi-inverter based on the round trip time such that the PLC with the charger is prevented from being interrupted in a process of charging a battery of the electric vehicle.

17 Claims, 9 Drawing Sheets

(56) References Cited

U.S. PATENT DOCUMENTS

2012/0295547 A1* 11/2012 Ichikawa ................ H04L 69/14
　　　　　　　　　　　　　　　　　　　　　　455/66.1
2012/0299715 A1* 11/2012 Ichikawa .................. H02J 7/02
　　　　　　　　　　　　　　　　　　　　　　340/455
2018/0354374 A1　12/2018 Lee et al.

* cited by examiner

CHARGING CONTROL DEVICE FOR ELECTRIC VEHICLE AND METHOD THEREOF

CROSS-REFERENCE TO RELATED APPLICATION

The present application claims priority to Korean Patent Application Nos. 10-2020-0101355 and 10-2020-0139532 filed on Aug. 12, 2020 and Oct. 26, 2020, respectively, the entire contents of which is incorporated herein for all purposes by this reference.

BACKGROUND OF THE INVENTION

Field of the Invention

The present invention relates to a technology for preventing time-out of power line communication (PLC) with a charger in a process of charging a battery of an electric vehicle using the charger.

Description of Related Art

In general, an electric vehicle obtains driving energy of an electric motor from a battery (e.g., a high voltage battery). Therefore, when the state of charge (SOC) value of a battery is lower than a reference value, charging is necessarily required. In the instant case, as the charging schemes, there are a boosting scheme in which the voltage (e.g., 400 V) of the charger is boosted to charge the battery, and a non-boosting scheme in which the battery is charged by use of the voltage (e.g., 800 V) of the charger as it is.

Because noise is generated by the charger during the charging process in the non-boosting scheme, the boosting scheme is mainly used. Such a boosting scheme includes a boosting scheme using a converter and a boosting scheme using a multi-inverter.

The boosting scheme using a converter, which is widely used, causes an increase in cost because a separate converter may be additionally provided in an electric vehicle.

The boosting scheme using a multi-inverter does not require a separate converter to boost the charging voltage of the battery, but noise occurs during the switching process for boosting the charging voltage.

Such noise acts as a factor that causes distortion in the PLC communication with the charger, which may be maintained in a process of charging the battery of the electric vehicle, causing the PLC communication with the charger to time out.

As described above, when the PLC communication with the charger is stopped, the charging of the battery is also stopped. Therefore, there is a need to provide a technology capable of preventing the PLC communication with the charger from being interrupted in a process of charging the battery of the electric vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a charging control device of an electric vehicle and a method thereof configured for requesting a charging required current from a charger in a state in which power line communication (PLC) with the charger is established, detecting a round trip time required to receive a response to the request, and adjusting a switching period of a multi-inverter based on the round trip time such that the PLC with the charger is prevented from being interrupted in a process of charging a battery of the electric vehicle.

Furthermore, various aspects of the present invention provide a charging control device of an electric vehicle and a method thereof configured for requesting a charging required current from a charger in a state in which PLC with the charger is established, detecting a round trip time required to receive a response to the request, and adjusting the charging required current based on the round trip time such that the PLC communication with the charger is prevented from being interrupted in a process of charging a battery of the electric vehicle.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a charging control device configured for an electric vehicle may include a communication device that performs power line communication (PLC) with a charger, a multi-inverter that boosts a charging voltage from the charger, and a controller that requests a charging required current from the charger, detects a round trip time required to receive a response corresponding to the request from the charger, and adjusts a switching period of the multi-inverter based on the determined round trip time.

The controller may adjust the switching period of the multi-inverter such that the determined round trip time does not exceed a reference round trip time.

The controller may increase the switching period of the multi-inverter when the determined round trip time does not exceed the reference round trip time, and may decrease the switching period of the multi-inverter when the determined round trip time exceeds the reference round trip time.

The controller may measure an initial round trip time a reference number of times, and may set the reference round trip time based on an average value of initial round trip times the measured reference number of times.

The electric vehicle may charge the high voltage battery with charging power corresponding to a first charging voltage supplied from the charger, The electric vehicle may boost a second charging voltage to the first charging voltage and charge the high voltage battery with a charging power corresponding to the first charging voltage when the second charging voltage lower than the first charging voltage is supplied from the charger.

According to various aspects of the present invention, a charging control device configured for an electric vehicle may include a communication device that performs power line communication (PLC) with a charger, and a controller that requests a charging required current from the charger, detects a round trip time required to receive a response corresponding to the request from the charger, and adjusts the charging required current based on the determined round trip time.

According to yet another aspect of the present invention, a charging control method for an electric vehicle may include connecting, by a communication device, a charger in power line communication (PLC), boosting, by a multi-inverter, a charging voltage of the charger, requesting, by a controller, a charging required current from the charger and determining a round trip time required to receive a response corresponding to the request from the charger, and adjusting, by the controller, a switching period of the multi-inverter based on the determined round trip time.

The charging control method may include determining whether the determined round trip time exceeds a reference round trip time, increasing the switching period of the multi-inverter when the determined round trip time does not exceed the reference round trip time as a determination result, and decreasing the switching period of the multi-inverter when the determined round trip time exceeds the reference round trip time as the determination result.

The charging control method may further include measuring an initial round trip time a reference number of times, and setting the reference round trip time based on an average value of initial round trip times the measured reference number of times.

The charging control method may further include charging, by the electric vehicle, a high voltage battery with charging power corresponding to a first charging voltage supplied from the charger, boosting, by the electric vehicle, a second charging voltage to the first charging voltage when the second charging voltage lower than the first charging voltage is supplied from the charger, and charging, by the electric vehicle, the high voltage battery with charging power corresponding to the first charging voltage boosted.

According to yet another aspect of the present invention, a charging control method for an electric vehicle may include connecting, by a communication device, a charger in power line communication (PLC), requesting, by a controller, a charging required current from the charger and determining a round trip time required to receive a response corresponding to the request from the charger, and adjusting, by the controller, the charging required current based on the determined round trip time.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
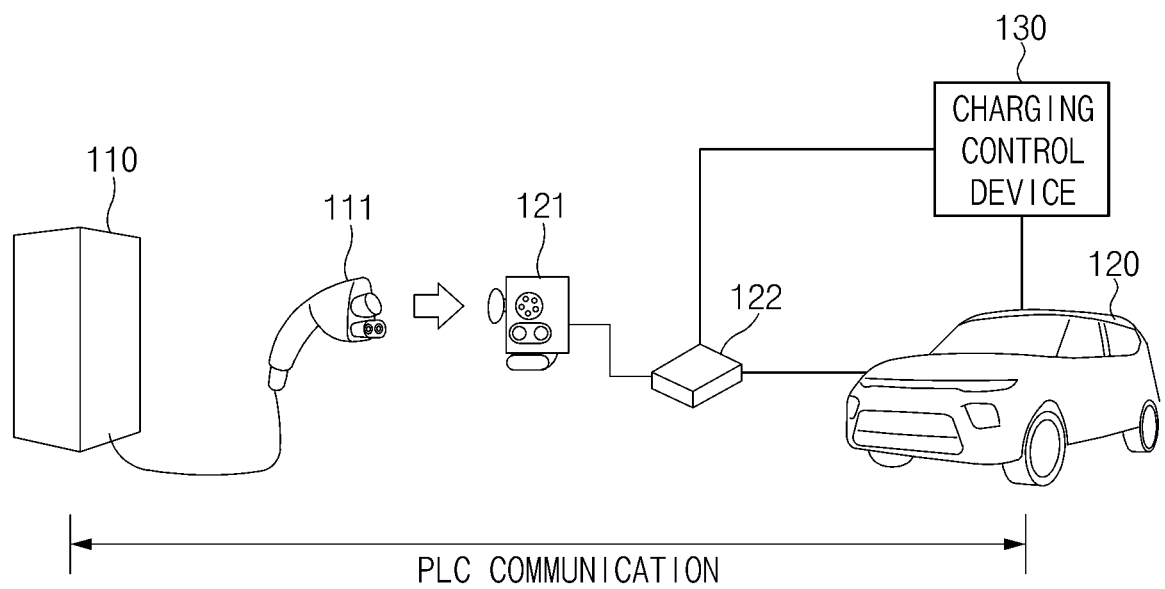
FIG. 1 is an exemplary view exemplarily illustrating a charging system for an electric vehicle to which various exemplary embodiments of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is an exemplary view exemplarily illustrating a charging system for an electric vehicle to which various exemplary embodiments of the present invention is applied.

As shown in FIG. 1, a charging system 100 for an electric vehicle to which various exemplary embodiments of the present invention is applied may include a charger 110 and a charging control device 130 provided in an electric vehicle 120.

The electric vehicle 120 may be provided with a high voltage battery charged by the charger 110, and may include a plug-in hybrid electric vehicle (PHEV) in addition to a pure electric vehicle.

At least one of a boosting scheme using a multi-inverter 122 and a boosting scheme using a converter may be applied to the electric vehicle 120. As an example, in the electric vehicle 120, the high voltage battery may be charged with charging power corresponding to 800 V supplied from the charger 110, or charging power corresponding to 800 V obtained by boosting 400 V supplied from the charger 110. In the instant case, the electric vehicle 120 may boost 400 V supplied from the charger 110 to 800 V based on the multi-inverter 122 having a boosting function.

For reference, such boosting scheme using the multi-inverter 122 based on an inverter which converts a direct current into a three-phase alternating current through a switching operation and a motor which generates a rotational force by use of the three-phase AC current input from the inverter. When the charging current from the charger 110 is applied to the neutral point (N) of the motor, the voltage of the neutral point (N) of the motor may be boosted corresponding to the duty of a switching element in the inverter.

The charger 110 provided in a charging station, which is a high-power charger, may have a DC combo-type outlet 111, and correspondingly, the electric vehicle 120 may have a DC combo-type inlet 121.

Furthermore, when the outlet 111 of the charger 110 is coupled to the inlet 121 of the electric vehicle 120, PLC may be possible so that a charging sequence may be performed between the charger 110 and the electric vehicle 120 through the PLC. In the instant case, the charging sequence may safely use any schemes.

The charger 110 may return a response corresponding to the request for charging current to the charging control device 130 and supply the charging current to the electric vehicle 120.

In a state in which the PLC with the charger 110 is established, the charging control device 130, which is a core configuration of the present invention, may request a charging required current from the charger 110 and detect the round trip time required to receive a response corresponding to the request. Accordingly, the charging control device 130 may adjust the switching period of the multi-inverter 122 based on the round trip time so that it is possible to prevent the PLC between the charging control device 130 and the charger 110 from being stopped in a process of charging the battery of the electric vehicle 120.

Furthermore, in a state in which the PLC with the charger 110 is established, the charging control device 130 may request the charging required current from the charger 110 and detect the round trip time required to receive a response corresponding to the request. Accordingly, the charging control device 130 may adjust the charging required current based on the round trip time, so that it is possible to prevent the PLC between the charging control device 130 and the charger 110 from being stopped in a process of charging the battery of the electric vehicle 120.

Hereinafter, the round trip time will be described with reference to FIG. 2A, FIG. 2B, FIG. 2C, and FIG. 2D.

Figure 2A:
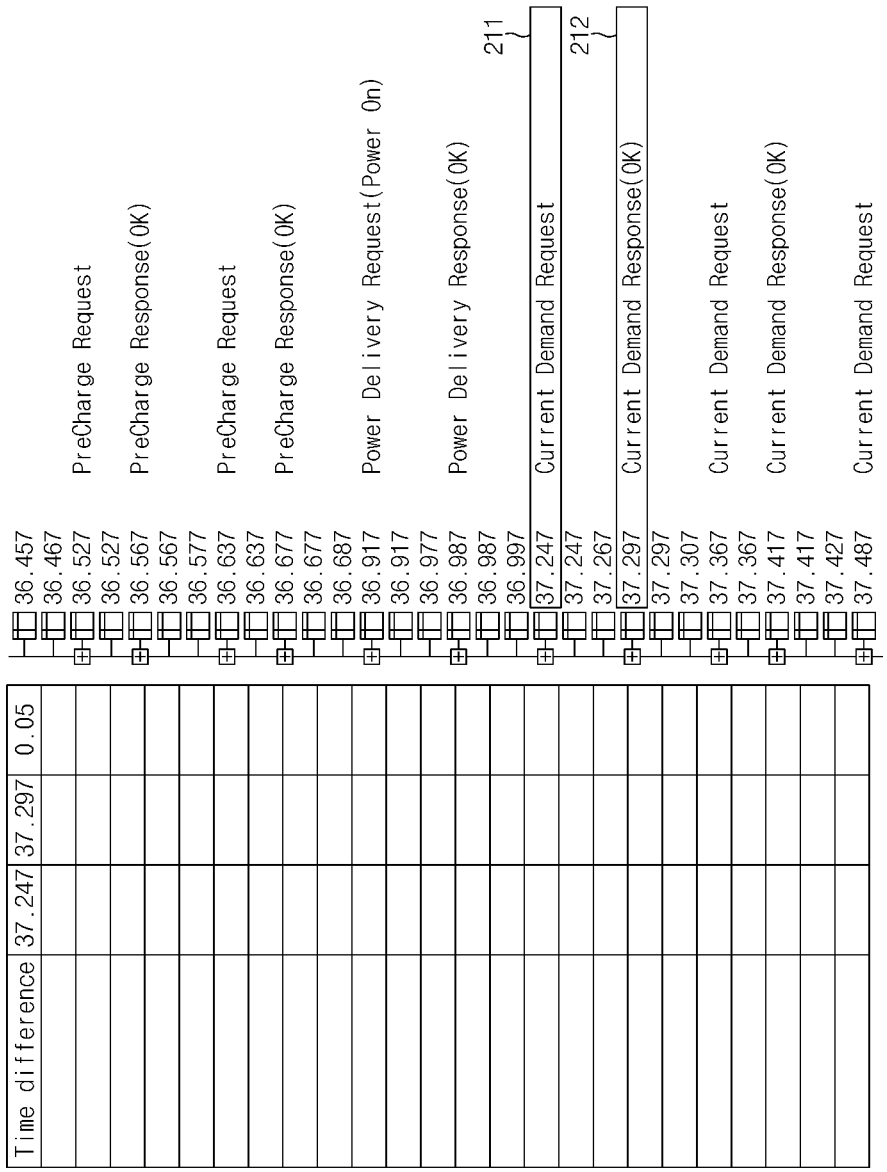
FIG. 2A is an exemplary view exemplarily illustrating the initial round trip time measured in a charging system of an electric vehicle to which various exemplary embodiments of the present invention is applied.

FIG. 2A is an exemplary view exemplarily illustrating the initial round trip time measured in a charging system of an electric vehicle to which various exemplary embodiments of the present invention is applied.

As shown in FIG. 2A, because the time point when the charging control device 130 requests the initial charging required current (e.g., 1 A) from the charger 110 is 37.247 seconds 211, and the time point when the charging control device 130 receives the response corresponding to the request from the charger 110 is 37.297 seconds 212, the initial round trip time is 0.05 seconds.

Because the initial round trip time means that the PLC communication is smooth, the interruption of PCL communication due to noise does not occur in a process of charging the battery of the electric vehicle 120.

Figure 2B:
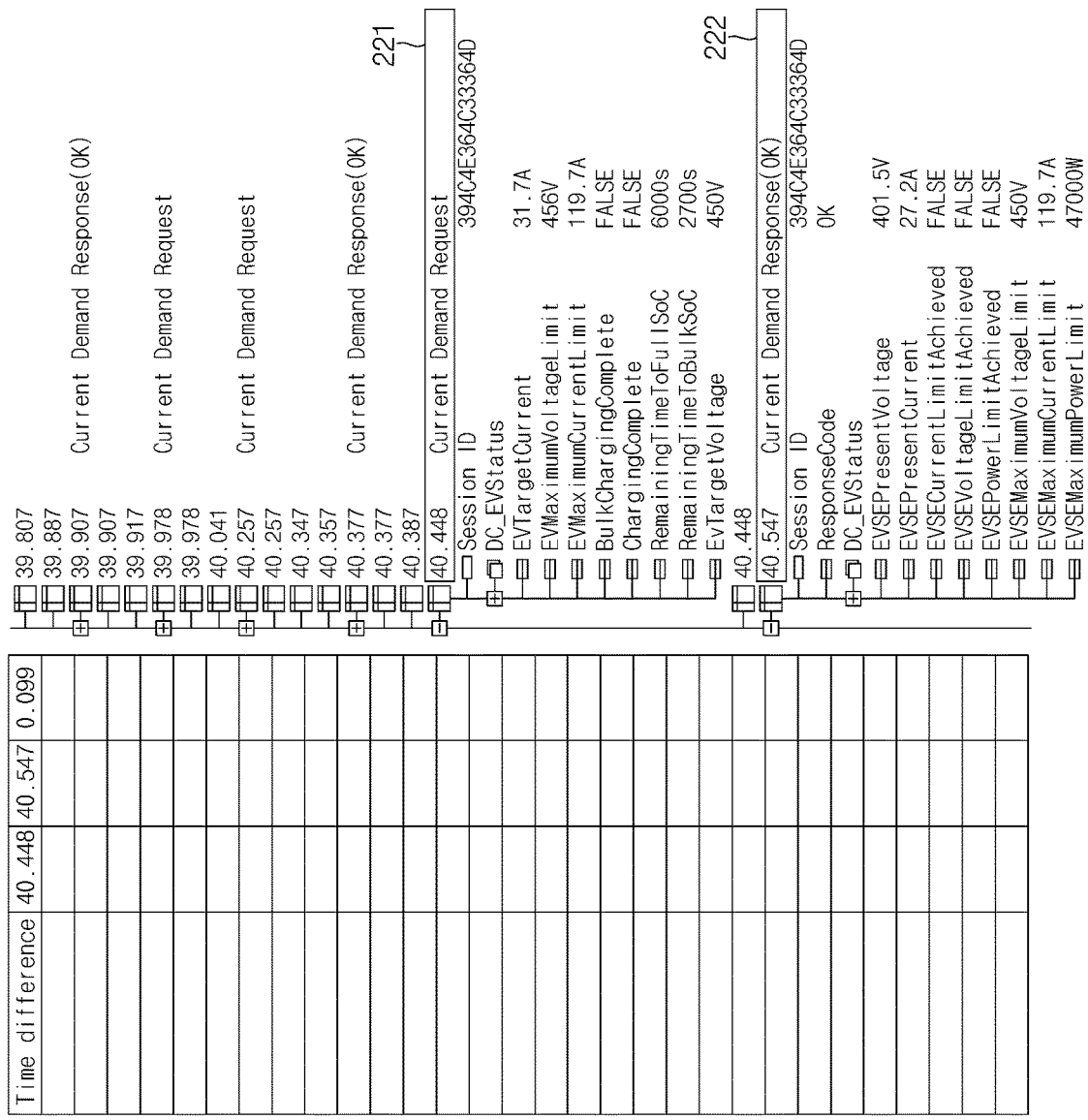
FIG. 2B is an exemplary view exemplarily illustrating a round trip time measured in a charging system for an electric vehicle to which various exemplary embodiments of the present invention is applied.

FIG. 2B is an exemplary view exemplarily illustrating a round trip time measured in a charging system for an electric vehicle to which various exemplary embodiments of the present invention is applied, and shows the round trip time occurring after the initial round trip time.

As shown in FIG. 2B, because the time point when the charging control device 130 requests the charging required current (e.g., 31.7 A) from the charger 110 is 40.448 seconds 221, and the time point when the charging control device 130 receives the response corresponding to the request from the charger 110 is 40.547 seconds 222, the round trip time is 0.099 seconds.

Accordingly, it may be understood that the round trip time increases due to the noise generated in a process of boosting the charging voltage from the 400 V charger or the noise generated by the 800 V charger when the charging required current increases. However, there is no interruption of PLC communication due to noise so far.

Figure 2C:
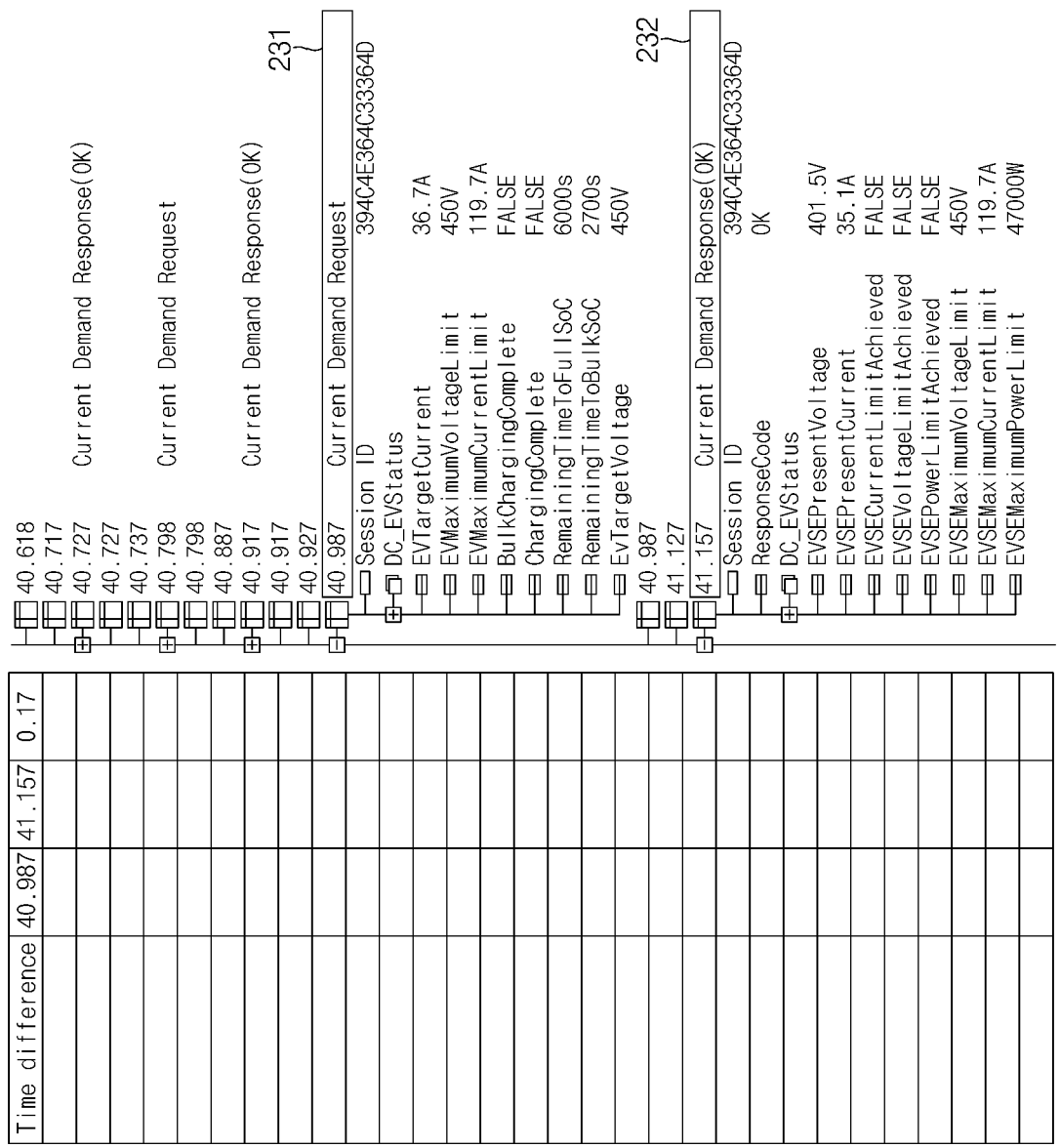
FIG. 2C is another exemplary view exemplarily illustrating a round trip time measured in a charging system of an electric vehicle to which various exemplary embodiments of the present invention is applied.

FIG. 2C is another exemplary view exemplarily illustrating the round trip time measured in the charging system of an electric vehicle to which various exemplary embodiments of the present invention is applied, and illustrates the round trip time generated after the round trip time of FIG. 2B.

As shown in FIG. 2C, because the time point when the charging control device 130 requests the charging required current (e.g., 36.7 A) from the charger 110 is 40.987 seconds 231, and the time point when the charging control device 130 receives the response corresponding to the request from the charger 110 is 41.157 seconds 232, the round trip time is 0.17 seconds.

Accordingly, it may be understood that the round trip time increases due to the noise generated in a process of boosting the charging voltage from the 400 V charger or the noise generated by the 800 V charger when the charging required current increases. However, there is no interruption of PLC communication due to noise so far.

Figure 2D:
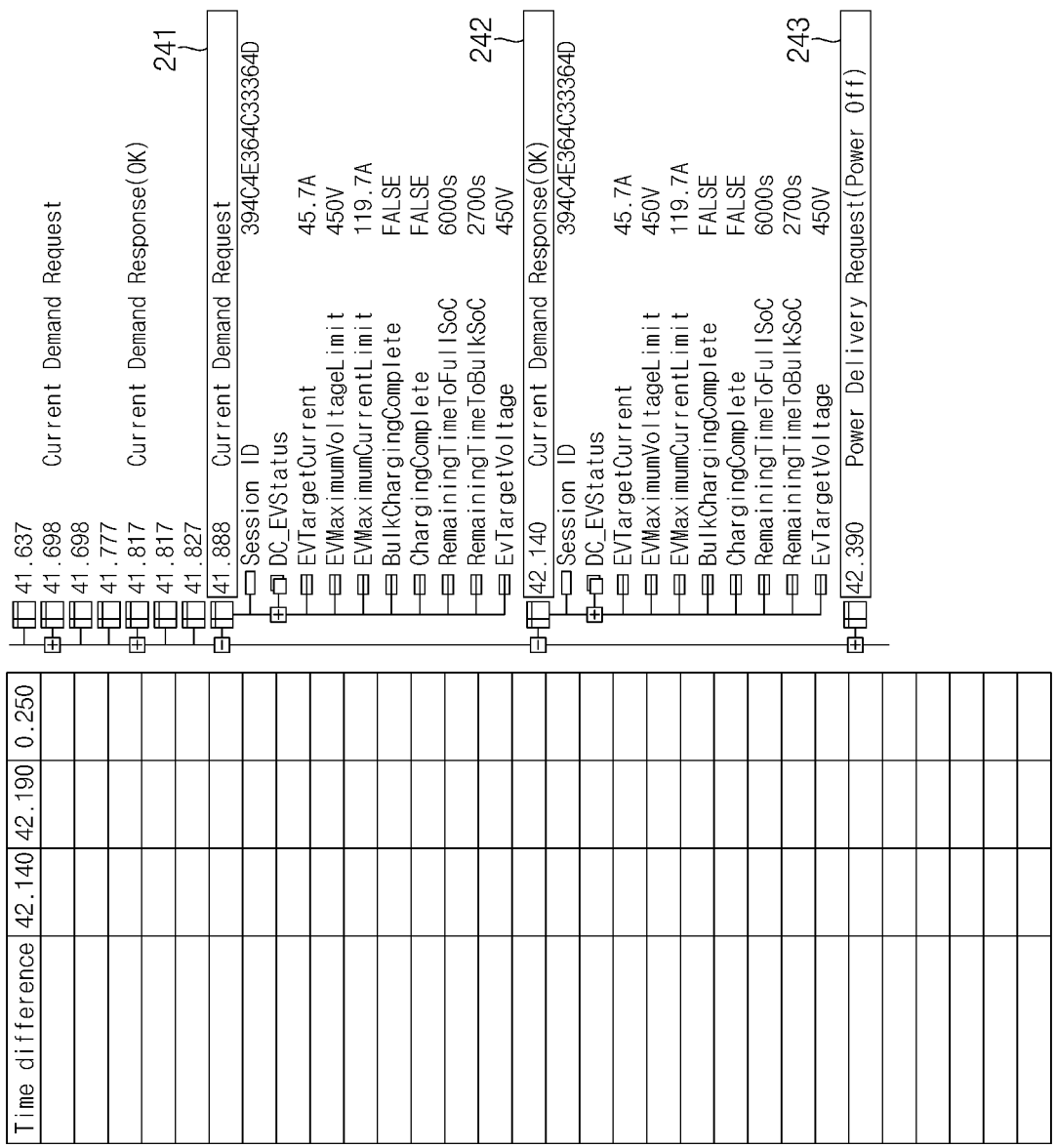
FIG. 2D is yet another exemplary view exemplarily illustrating a round trip time measured in a charging system for an electric vehicle to which various exemplary embodiments of the present invention is applied.

FIG. 2D is yet another exemplary view exemplarily illustrating a round trip time measured in a charging system for an electric vehicle to which various exemplary embodiments of the present invention is applied, and illustrates the round trip time generated after the round trip time of FIG. 2C.

As shown in FIG. 2D, the time point when the charging control device 130 requests the charging required current (e.g., 45.7 A) from the charger 110 is 41.888 seconds 241. However, the charging control device 130 did not receive a response corresponding to the request from the charger 110 within a reference round trip time (e.g., 250 ms).

Accordingly, the charging control device 130 re-requests the charging required current (e.g., 45.7 A) from the charger 110 at 42.140 seconds 242.

Nevertheless, when the charging control device 130 does not receive a response corresponding to the re-request within a reference round trip time (e.g., 250 ms), the charging control device 130 may perform a charging termination sequence 243.

Accordingly, it may be understood that the re-request is performed when the response to a first request is not within a reference round trip time, and the charging termination sequence is performed when the response to the re-request is not within the reference round trip time.

Furthermore, it may be understood that when the charging required current is too high, the PLC with the charger 110 is terminated due to the noise generated in a process of boosting the charging voltage from the 400V charger or noise generated by the 800V charger so that the round trip time exceeds the reference round trip time.

In the end portion, it may be understood that as the charging required current increases, the influence of the noise on the PLC increases.

In consideration of the characteristics of the round trip time corresponding to the charging required current, the charging control device 130 may adjust the charging required current.

Meanwhile, to control the noise generated in a process of boosting the charging voltage from the 400V charger, the charging required current may be adjusted in the indirect scheme described above, but the switching period of a multi-inverter 122 that performs a boosting function of the charging voltage may also be adjusted in a direct scheme.

Figure 3:
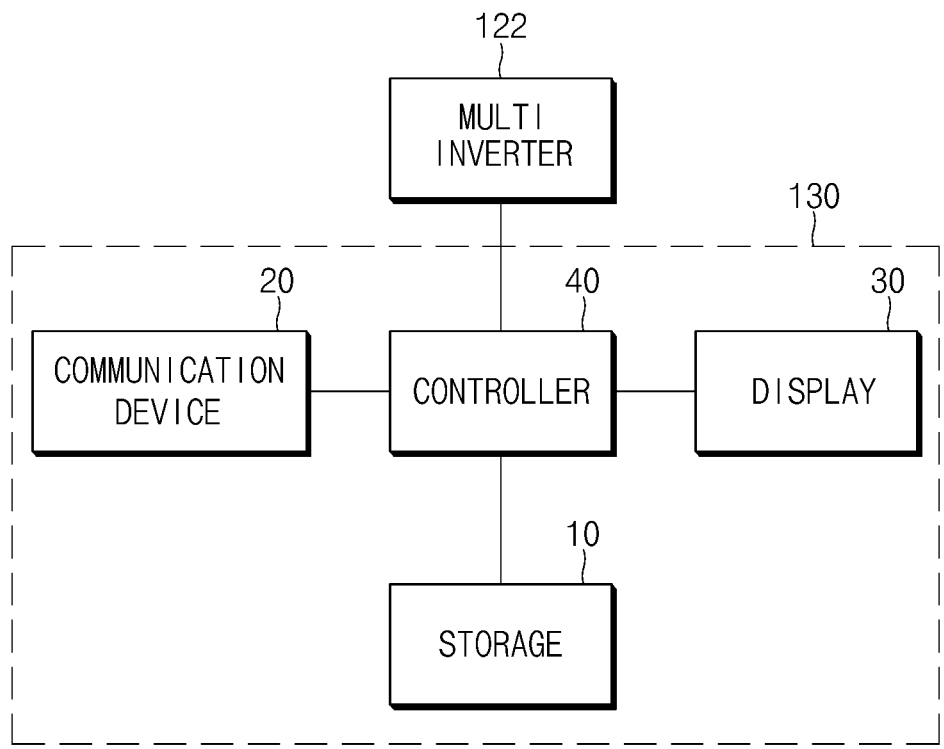
FIG. 3 is a block diagram illustrating a charging control device configured for an electric vehicle according to various exemplary embodiments of the present invention.

FIG. 3 is a block diagram illustrating a charging control device configured for an electric vehicle according to various exemplary embodiments of the present invention.

As shown in FIG. 3, the charging control device 130 for an electric vehicle according to various exemplary embodiments of the present invention may include storage 10, a communication device 20, a display 30, and a controller 40. In the instant case, according to a scheme of implementing the charging control device 130 for an electric vehicle according to various exemplary embodiments of the present invention, components may be combined with each other to be implemented as one, or some components may be omitted.

Examining each component, first, in a state in which the PLC with the charger 110 is established, the storage 10 may store various logics, algorithms, and programs required in a process of requesting a charging required current from the charger 110, detecting a round trip time required to receive a response corresponding to the request from the charger, and adjusting the charging required current based on the round trip time.

The storage 10 may store a reference round trip time (e.g., 250 ms) used to adjust the charging required current requested from the charger 110. The reference round trip time may be arbitrarily changed according to the intention of the designer.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

The communication device 20, which is a module communicating with the charger 110 in a PLC scheme, may perform a charging sequence with the charger 110 under control of the controller 40. The communication device 20 may transmit a message (Current Demand Request) requesting a charging required current to the charger 110, and receive a response message (Current Demand Response) corresponding to the request message from the charger 110.

The display 30 may display a procedure of a charging sequence, and may display a charging current supplied to the battery.

The controller 40 may perform overall control so that each of components can normally perform their functions. The controller 40 may be implemented in a form of hardware, software, or a combination of hardware and software. The controller 40 may be implemented with a microprocessor, but is not limited thereto.

A state in which the PLC with the charger 110 is established, the controller 40 may perform various controls in a process of requesting the charging required current from the charger 110, detecting the round trip time required to receive a response corresponding to the request from the charger, and adjusting the charging required current or the switching period of the multi-inverter 122 based on the round trip time.

The controller 40 may control the communication device 20 to transmit the message (Current Demand Request) requesting the charging required current to the charger 110 and receive the response message (Current Demand Response) corresponding to the request message from the charger 110.

The controller 40 may measure the round trip time required to transmit the message (Current Demand Request) requesting the charging required current to the charger 110 and receive the response message (Current Demand Response) corresponding to the request message from the charger 110.

The controller 40 may set the reference round trip time based on the measured round trip time. For example, the controller 40 may set twice or three times the measured round trip time as the reference round trip time.

The controller 40 may determine the average value of the round trip time measured for the initial n times (e.g., 5 times), and may set the reference round trip time based on the determined average value. For example, the controller 40 may set twice or three times the determined average value as the reference round trip time.

The controller 40 may increase the charging required current to the extent that the PLC is normally performed without interruption. In the instant case, the controller 40 may increase the charging required current in consideration of the state of the battery (e.g., performance, deterioration degree, battery state of health (SOH)), and the like.

The controller 40 may control the switching period of the multi-inverter 122 while maintaining the charging required current requested from the charger 110, so that it is possible to prevent the PLC communication from being interrupted due to noise generated in a process of supplying the charging required current.

Hereinafter, a detailed operation of the controller 40 will be described with reference to FIG. 4 and FIG. 5.

Figure 4:
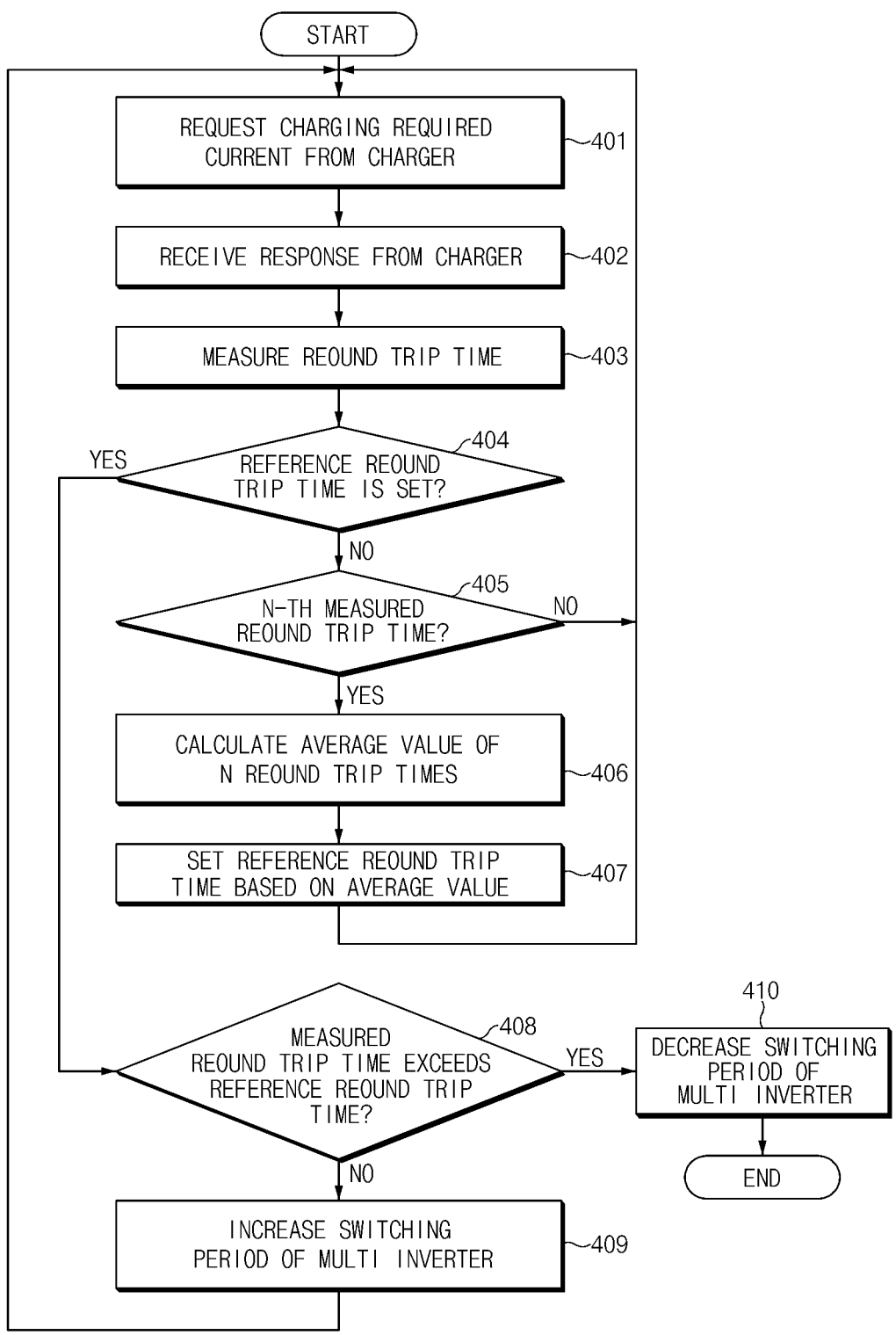
FIG. 4 is a flowchart of a charging control method for an electric vehicle according to various exemplary embodiments of the present invention.

FIG. 4 is a flowchart of a charging control method for an electric vehicle according to an exemplary embodiment of the present invention.

First, when the outlet 111 of the charger 110 is coupled to the inlet 121 of the electric vehicle 120, the controller 40 may proceed with a charging sequence. In 401, the controller 40 may request the charging required current from the charger 110 through power line communication (PLC). In the instant case, the initial charging required current may be 1 A, and the charging required current may increase gradually.

Thereafter, in 402, the controller 40 may receive the response corresponding to the request for the charging required current from the charger 110. Accordingly, in 403, the controller 40 may determine the round trip time required to request the charging required current from the charger 110 and receive the response corresponding to the request.

Thereafter, in 404, the controller 40 may determine whether the reference round trip time is set.

When it is determined in 404 that the reference round trip time is not set as the determining result, in 405, the controller 40 may determine whether the measured round trip time is the n-th measured round trip time.

When it is determined in 405 that the measured round trip time is not the n-th measured round trip time, the controller 40 proceeds to operation 401.

When it is determined in 405 that the measured round trip time is the n-th measured round trip time as the determining result, the controller 40 may determine the average value of n round trip times in 406.

Thereafter, in 407, the controller 40 may set the reference round trip time based on the determined average value. In the instant case, because the initial round trip times measured n times is a value measured while the PLC is performed normally, the reference round trip time may be set based on the initial round trip times measured n times.

When it is determined in 404 that the reference round trip time is set as the determining result, in 408, it is possible to determine whether the measured round trip time exceeds the reference round trip time.

When it is determined in 408 that the measured round trip time does not exceed the reference round trip time as the determining result, the controller 40 may increase the switching period of the multi-inverter 122 in 409. In the instant case, the controller 40 may maintain the switching period of the multi-inverter 122, where the increase in the switching period of the multi-inverter 122 means that the switching period is shortened.

When it is determined in 408 that the measured round trip time exceeds the reference round trip time as the determining result, the controller 40 may decrease the switching period of the multi-inverter 122 in 410. That is, by setting the switching period of the multi-inverter 122 to be longer, the number of switching per reference time may be reduced.

In the end, the controller 40 may increase the switching period of the multi-inverter 122 until the measured round trip time does not exceed the reference round trip time.

Figure 5:
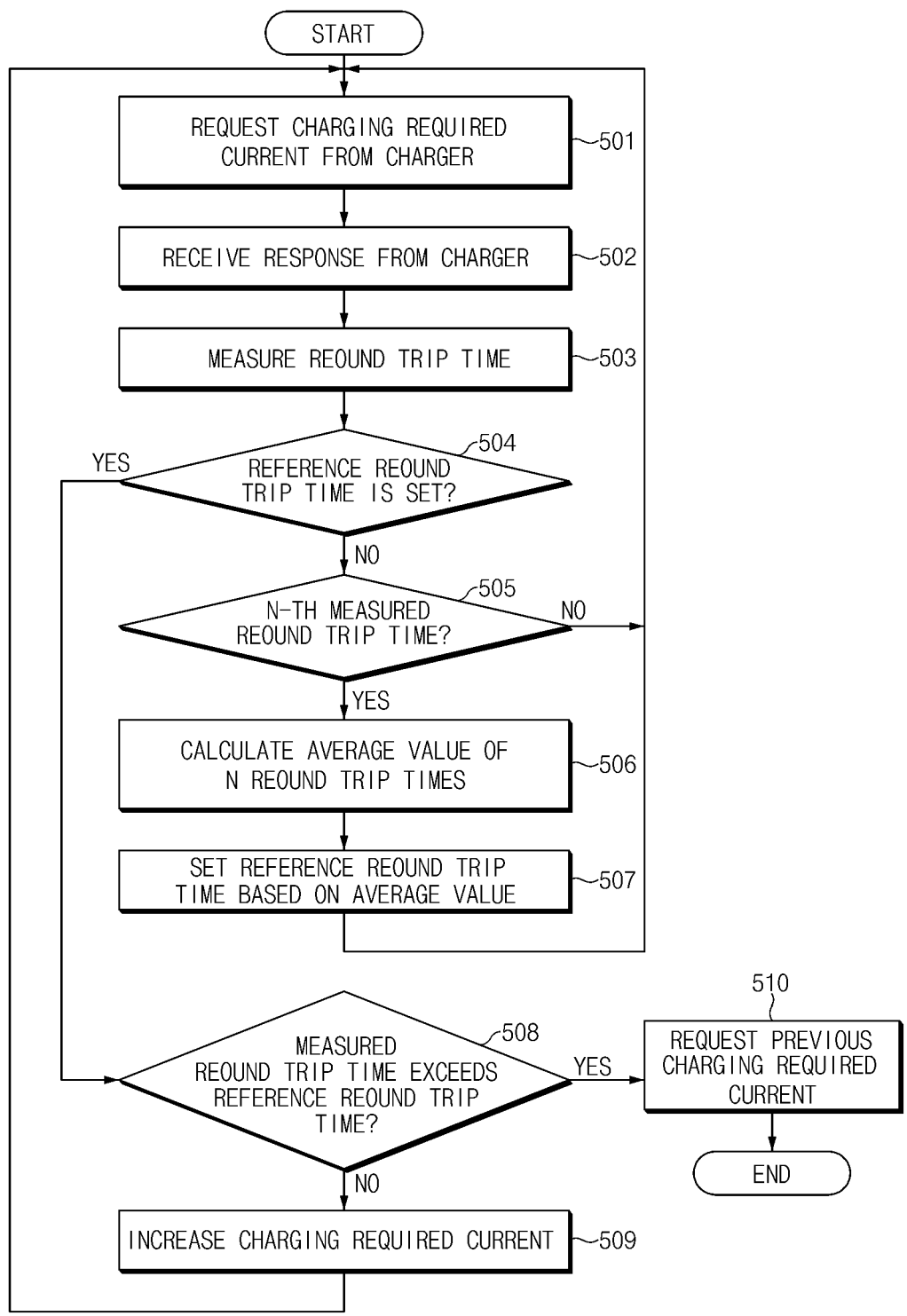
FIG. 5 is a flowchart of a charging control method for an electric vehicle according to various exemplary embodiments of the present invention.

FIG. 5 is a flowchart of a charging control method for an electric vehicle according to another exemplary embodiment of the present invention.

First, when the outlet 111 of the charger 110 is coupled to the inlet 121 of the electric vehicle 120, the controller 40 may proceed with a charging sequence. In 501, the controller 40 may request the charging required current from the charger 110 through power line communication (PLC). In the instant case, the initial charging required current may be 1 A, and the charging required current may increase gradually.

Thereafter, in 502, the controller 40 may receive the response corresponding to the request for the charging required current from the charger 110. Accordingly, in 503, the controller 40 may determine the round trip time required to request the charging required current from the charger 110 and receive the response corresponding to the request.

Thereafter, in 504, the controller 40 may determine whether the reference round trip time is set.

When it is determined in 504 that the reference round trip time is not set as the determining result, in 505, the controller 40 may determine whether the measured round trip time is the n-th measured round trip time.

When it is determined in 505 that the measured round trip time is not the n-th measured round trip time as the determining result, the controller 40 proceeds to operation 501.

When it is determined in 505 that the measured round trip time is the n-th measured round trip time as the determining result, the controller 40 may determine the average value of n round trip times in 506.

Thereafter, in 507, the controller 40 may set the reference round trip time based on the determined average value. In the instant case, because the initial round trip times measured n times is a value measured while the PLC is performed normally, the reference round trip time may be set based on the initial round trip times measured n times.

When it is determined in 504 that the reference round trip time is set as the determining result, in 508, it is possible to determine whether the measured round trip time exceeds the reference round trip time.

When it is determined in 508 that the measured round trip time does not exceed the reference round trip time as the determining result, the controller 40 may increase the charging required current in 509.

When it is determined in 508 that the measured round trip time exceeds the reference round trip time as the determining result, the controller 40 may request the previous charging required current from the charger 110 in 510. That is, the previous charging required current may be maintained.

In the end, the controller 40 may increase the charging required current until the measured round trip time does not exceed the reference round trip time.

Figure 6:
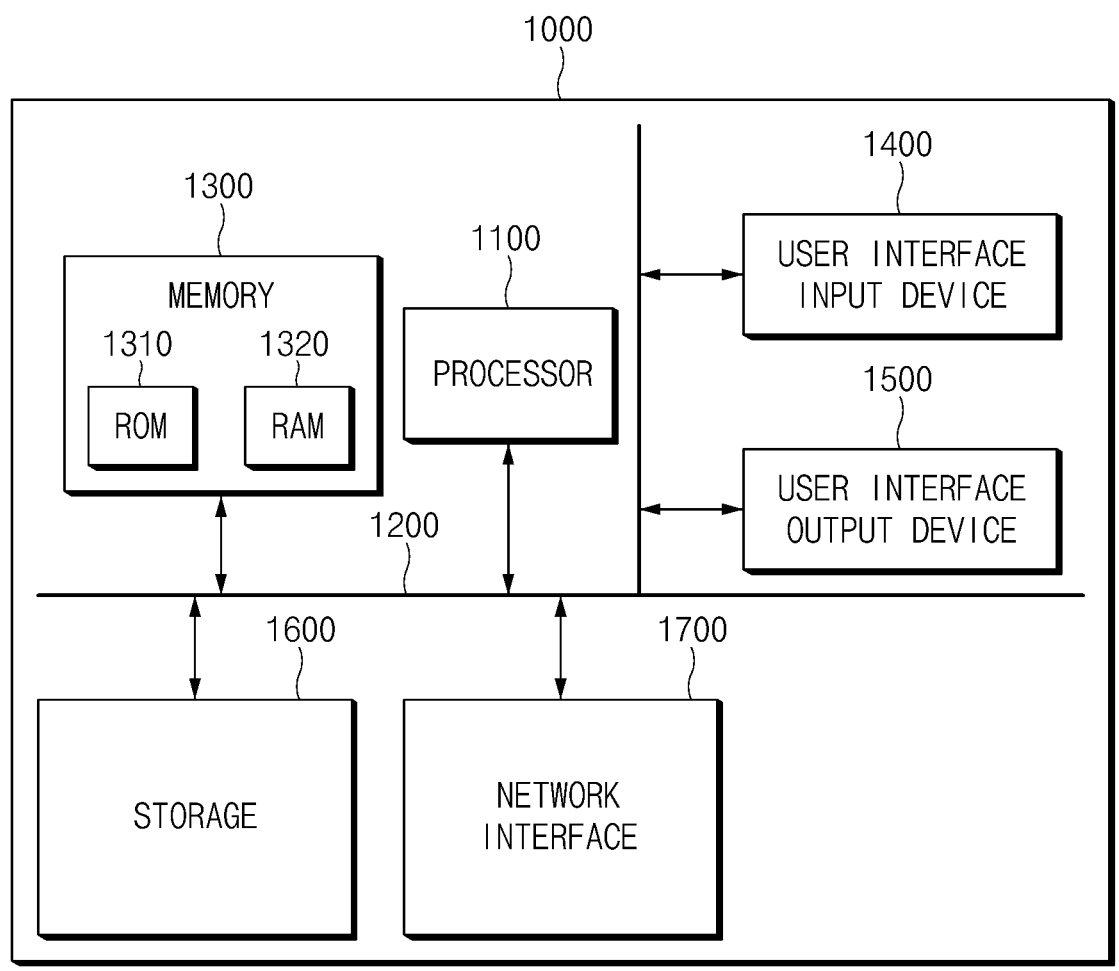
FIG. 6 is a view exemplarily illustrating a computing system for executing a charging control method for an electric vehicle according to various exemplary embodiments of the present invention.

FIG. 6 is a view exemplarily illustrating a computing system for executing a charging control method for an electric vehicle according to various exemplary embodiments of the present invention.

Referring to FIG. 6, the charging control method for an electric vehicle according to various exemplary embodiments of the present invention described above may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU), or a semiconductor device that processes instructions stored in the memory 1300 or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the exemplary embodiments of the present invention may be implemented directly by hardware executed by the processor 1100, a software module, or a combination thereof. The software module may reside in a storage medium (that is, the memory 1300 or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The charging control device configured for an electric vehicle and the method thereof according to the exemplary embodiments are configured for requesting a charging required current from a charger in a state in which power line communication (PLC) with the charger is established, detecting a round trip time required to receive a response to the request, and adjusting a switching period of a multi-inverter based on the round trip time such that the PLC with the charger is prevented from being interrupted in a process of charging a battery of the electric vehicle.

Furthermore, the charging control device configured for an electric vehicle and the method thereof according to the exemplary embodiments are configured for requesting a charging required current from a charger in a state in which PLC with the charger is established, detecting a round trip time required to receive a response to the request, and adjusting the charging required current based on the round trip time such that the PLC communication with the charger is prevented from being interrupted.

The above description is a simple exemplification of the technical spirit of the present invention, and the present invention may be variously corrected and modified by those skilled in the art to which various exemplary embodiments of the present invention pertains without departing from the essential features of the present invention.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A charging control device of a vehicle, the charging control device comprising:
   a communication device configured to perform power line communication (PLC) with a charger provided in a charging station;
   a multi-inverter configured to boost a charging voltage from the charger; and
   a controller connected to the communication device and the multi-inverter and configured for requesting a charging required current from the charger, for measuring a round trip time required to receive a response corresponding to the requesting from the charger, and for adjusting a switching period of the multi-inverter according to the determined round trip time.

2. The charging control device of claim 1, wherein the controller is configured to adjust the switching period of the multi-inverter so that the determined round trip time does not exceed a reference round trip time.

3. The charging control device of claim 2, wherein the controller is configured to increase the switching period of the multi-inverter upon determining that the determined round trip time does not exceed the reference round trip time.

4. The charging control device of claim 2, wherein the controller is configured to decrease the switching period of the multi-inverter upon determining that the determined round trip time exceeds the reference round trip time.

5. The charging control device of claim 2, wherein the controller is configured to measure an initial round trip time a reference number of times, and configured to set the reference round trip time according to an average value of initial round trip time the measured reference number of times.

6. The charging control device of claim 5, wherein before measuring the initial round trip time the reference number of times, and upon determining that the reference round trip time is not set and the measured round trip time is a predetermined number measured round trip time, the controller is configured to determine an average value of predetermined number measured round trip times.

7. The charging control device of claim 1, further including:
   a battery,
   wherein the vehicle charges the battery with charging power corresponding to a first charging voltage supplied from the charger, or boosts a second charging voltage to the first charging voltage and charges the battery with a charging power corresponding to the first charging voltage upon determining that the second charging voltage lower than the first charging voltage is supplied from the charger.

8. A charging control device for a vehicle, the charging control device comprising:
   a communication device configured to perform power line communication (PLC) with a charger provided in a charging station; and
   a controller connected to the communication device and configured to request a charging required current from the charger, to measure a round trip time required to receive a response corresponding to the requesting from the charger, and to adjust the charging required current according to the determined round trip time.

9. A charging control method for a vehicle, the charging control method comprising:
   connecting, by a communication device, a charger provided in a charging station in power line communication (PLC);
   boosting, by a multi-inverter, a charging voltage of the charger;
   requesting, by a controller connected to the communication device and the multi-inverter, a charging required current from the charger and determining a round trip time required to receive a response corresponding to the requesting from the charger; and
   adjusting, by the controller, a switching period of the multi-inverter according to the determined round trip time.

10. The charging control method of claim 9, wherein the adjusting of the switching period of the multi-inverter includes:
    determining whether the determined round trip time exceeds a reference round trip time;
    increasing the switching period of the multi-inverter upon determining that the determined round trip time does not exceed the reference round trip time as a result of determining whether the determined round trip time exceeds the reference round trip time.

11. The charging control method of claim 10, wherein the adjusting of the switching period of the multi-inverter further includes:
decreasing the switching period of the multi-inverter upon determining that the determined round trip time exceeds the reference round trip time as the result.

12. The charging control method of claim 10, wherein the adjusting of the switching period of the multi-inverter further includes:
measuring an initial round trip time a reference number of times; and
setting the reference round trip time according to an average value of initial round trip times the measured reference number of times.

13. The charging control method of claim 12, wherein before measuring the initial round trip time the reference number of times, and upon determining that the reference round trip time is not set and the measured round trip time is a predetermined number round trip time, the controller is configured to determine an average value of predetermined number measured round trip times.

14. The charging control method of claim 9, further including:
charging, by the vehicle, a battery of the vehicle with charging power corresponding to a first charging voltage supplied from the charger;
boosting, by the vehicle, a second charging voltage to the first charging voltage upon determining that the second charging voltage lower than the first charging voltage is supplied from the charger; and
charging, by the vehicle, the battery with charging power corresponding to the first charging voltage boosted.

15. A charging control method for a vehicle, the charging control method comprising:
connecting, by a communication device, a charger provided in a charging station in power line communication (PLC);
requesting, by a controller, a charging required current from the charger and determining a round trip time required to receive a response corresponding to the requesting from the charger; and
adjusting, by the controller, the charging required current according to the determined round trip time.

16. The charging control method of claim 9 wherein the controller includes:
a processor; and
a non-transitory storage medium on which a program for performing the charging control method of claim 9 is recorded and executed by the processor.

17. A non-transitory computer readable medium on which a program for performing the charging control method of claim 9 is recorded.

* * * * *